(No Model.)
H. L. HOPKINS.
HARVESTER CUTTER.
No. 273,082. Patented Feb. 27, 1883.
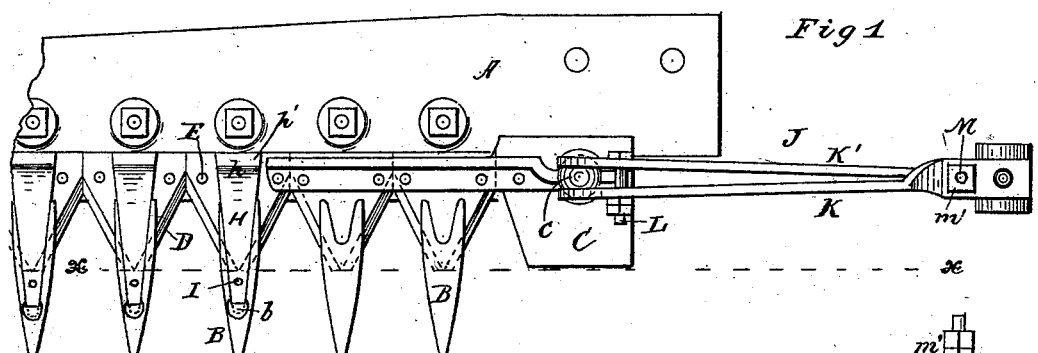
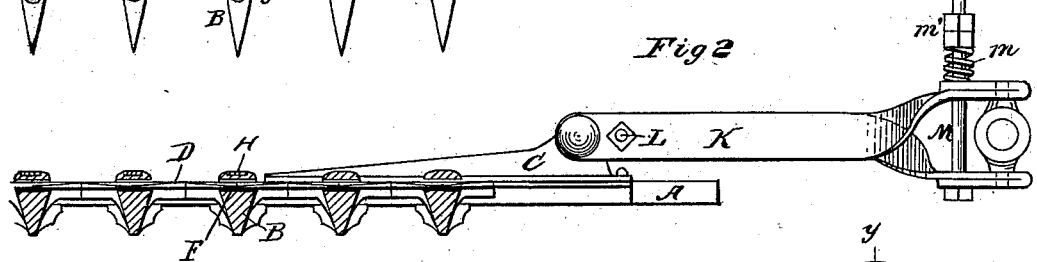
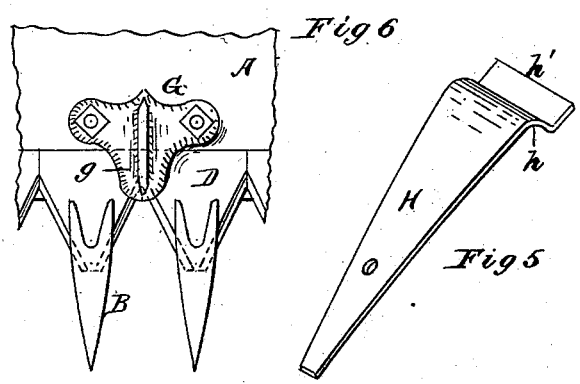
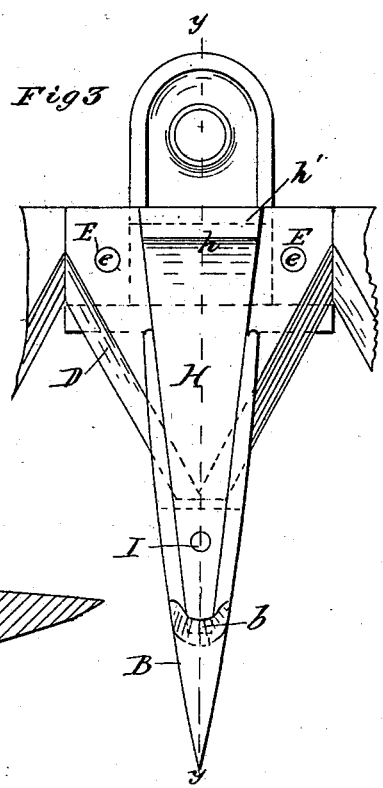
Witnesses
Inventor
Harvey L. Hopkins
By Coburn & Thacher
Attorneys

UNITED STATES PATENT OFFICE.

HARVEY L. HOPKINS, OF CHICAGO, ILLINOIS.

HARVESTER-CUTTER.

SPECIFICATION forming part of Letters Patent No. 273,082, dated February 27, 1883.

Application filed September 8, 1882. (No model.)

*To all whom it may concern:*

Be it known that I, HARVEY L. HOPKINS, a citizen of the United States, residing at Chicago, in the county of Cook and State of Illinois, have invented certain new and useful Improvements in Harvester-Cutters, which are fully described in the following specification, reference being had to the accompanying drawings, in which—

Figure 1 represents a plan view of a section of a cutting apparatus for harvesters and the pitman embodying my invention; Fig. 2, a section of the same, taken on the line $x\,x$, Fig. 1; Fig. 3, a plan view of a single guard-finger and knife-section on an enlarged scale; Fig. 4, a section of the same, taken on the line $y\,y$, Fig. 3; Fig. 5, a perspective view of one of the springs which holds the cutter-bar in place detached from the finger; and Fig. 6, a detail plan of a part of a cutting apparatus provided with the ordinary cap for the cutter-bar, on the same scale as Fig. 1.

My invention relates to certain improvements in the cutting apparatus of mowers and other harvesting-machines, whereby I am enabled to dispense with the usual cutter-caps, which are employed to hold the cutters down to work so as to obtain a shearing cut.

I will proceed to explain in detail the construction, application, and operation of the devices by means of which I have embodied my invention in practical form, and will then point out definitely in the claims the special improvements which I believe to be new and desire to protect by Letters Patent.

In the drawings, A represents a finger-bar of ordinary construction, and B the guard-fingers which are attached thereto, and which are also of ordinary construction, except as hereinafter explained. The cutter-bar C is of usual form, and the cutters or knives D are of ordinary triangular shape, and attached to the cutter-bar, in the usual way, by rivets E, except that these rivets have elongated heads $e$, projecting above the knives, as shown in Fig. 4 of the drawings. The guard-fingers are preferably provided with the usual ledger-plates, F, against which the knives act. In order to secure the proper operation of the knives, it is necessary that they should be held down to their work, so that as the cutter-bar is reciprocated the knives will move close to the cutting-edges on the guard-fingers. The usual device in use for this purpose is a cap attached to the finger-bar in rear of the cutters and projecting forward over the latter. This old device is illustrated in Fig. 6 of the drawings, in which G represents the cap. Of course, to accomplish the desired end, it is necessary that the point $g$, which projects forward over the knives, should be brought down very close to the surface of the latter—in fact, almost in contact therewith. Now, this being the case, it is found in practice that in a very short time fine short grass, dirt, gum, or other foreign substances will accumulate under the cap, so as to increase the friction, and, in fact, sometimes cause the cutters to bind, so that it is almost impossible to drive the cutter-bar on account of sticking. It is to obviate this difficulty that my present improvement is especially designed.

I provide a spring-plate, H, tapering from one end to the other, the taper preferably corresponding substantially to that of the guard-fingers, though preferably of somewhat less width, and the taper runs from the rear to the front end of the plate. In the upper surface of the guard-fingers, near the front end, I provide a small recess, $b$, adapted to receive the narrow front end of the spring-plate, which is also secured to the guard-finger by a rivet, I, passing down through the latter a little way back from the recess. The spring is preferably seated in the upper surface of the guard-finger, the latter being cut out for this purpose, so that after the attachment is made the parts may be finished up to present a substantially smooth surface. The rear or broad end of this spring-plate has a somewhat short curve, $k$, downward, and then is bent back into a horizontal position, so as to provide a short flat section, $h'$, which is arranged to rest on the rear end of the knives, as shown in Figs. 3 and 4 of the drawings. The spring is arranged so that at its rear end it rests lightly upon or scarcely touches the knives, but at the same time will resist any tendency in the latter to rise upward, and so will hold them down in proper position to obtain a satisfactory shearing cut, but with little friction. The long heads of the knife-rivets extend up under the spring just in front of the bend, as seen in Fig. 4 of the drawings, and, in connection with the spring, serve to clean out all long grasses, which, without these projecting heads or some equivalent device, would wind about the springs. The short grasses, gum, dirt, &c., which soon fill up the space under the ordinary cutter-caps and cause the cutters to bind, will work out from under the rear end of the spring, as the space is open and there is nothing to impede; or, if some portion collects and sticks to the spring, the latter yields sufficiently to prevent any substantial increase in friction, and the cutter-bar is reciprocated with substantially the same ease after use for hours and days as when first started. Now, it is obvious that as the spring rests upon the rear end of the knives (and there will be some slight wear) there will be more or less tendency to tilt up the front ends of the knives slightly. It is of course desirable to counteract this tendency, and it may be accomplished in various ways. The box or guard used in some instances for the head of the cutter-bar to slide in will counteract this tendency; or some special device may be employed to prevent tilting, or the blind knife-section may be utilized for this purpose. In the drawings, however, I have shown a pitman, J, applied to this cutter, of peculiar construction, and which will operate to entirely counteract the tendency to tilt upward the front ends of the knives. This pitman is composed of two independent twisted bars, K K', at their lower ends, embracing a ball, c, on the head of the cutter-bar, and held together and adjusted by a bolt, L, at this point, while at their upper ends, which, on account of the twist, are at right angles to the lower ends, they are connected by a bolt, M, which is provided with a spring, m, and nut m'. This pitman has heretofore been patented by me, and its construction and operation need not be set forth particularly here. The tightening of the nut on the bolt at the upper end of the two parts of the pitman, by reason of the twist in the two bars, tends to throw downward the front bar, K, and to pull upward the rear bar, K', and this tendency will entirely overcome the tendency of the cutters to tilt upward, so that, in connection with the spring-holder, the knives will always run parallel with the face of the guard-fingers and close thereto, so as to insure a perfect cut. This peculiar pitman is therefore specially adapted to work in connection with the spring cutter-cap described above.

There are modifications of the construction and arrangement of the parts constituting my improvement which may be made without destroying the gist of my invention. The spring may be made to answer for the cap or upper portion of the guard-finger, thus dispensing with the ordinary open guard-cap; but it would hardly be so desirable a construction as that described above, as the spring would necessarily be heavier and stiffer in order to resist the force of the knife when suddenly stopped by any obstruction, and so the clearing of grass and dirt would be less satisfactorily effected, for in order to secure the performance of the latter function the spring should have easy elasticity. The mode of attaching the spring to the guard may be modified and the shape of the spring may be changed, provided always it is brought to bear or nearly to bear on the knives at its free end. The spring may be used without the long rivet-heads; but the result will not be entirely satisfactory, for there is then danger of clogging from the long grass twisting about the spring. I have found in practice that the best results are obtained by combining the long rivet-heads with the spring. The spring-caps may be put on any or all of the guard-fingers, though from three to five will be sufficient.

I have stated above some of the advantages of using my double-barred pitman in connection with this holder, and, in addition, it may be stated that it is claimed by some that if the knives are held evenly and firmly to the ledger-plates they will be kept constantly sharp by the friction between the two plates, and if this is so the pitman and spring working together will secure this result very satisfactorily.

I do not wish to be understood as limiting myself in all particulars to the construction and arrangement of the parts herein described and shown, but to include as within the field of my invention such variations as may be made without changing the real principle of operation which belongs to my improvements.

Having thus described my invention, what I claim as new, and desire to secure by Letters Patent, is—

1. In a harvester-cutting apparatus, an elastic cap attached at its front end to the guard-finger, extending backward partly over the cutter-bar, and with its rear end free and resting upon or nearly in contact with the rear ends of the knives, leaving a free space in rear of the cap, substantially as and for the purposes set forth.

2. The guard-finger, in combination with the cutters, the spring plate-cap, attached at its front end to the finger, extending backward and bent downward at its rear end to touch, or nearly so, the rear ends of the knives, and the knife-rivets provided with long projecting heads, substantially as and for the purposes set forth.

3. The guard-fingers, in combination with the reciprocating cutters, the spring-cap, with its rear end free and resting on the rear end of the knives, the pitman composed of two independent twisted bars, K K', and an adjusting device, substantially as and for the purposes set forth.

4. The guard-fingers B, in combination with the cutter-bar C, provided with a ball, c, knives D, knife-rivets E, having long projecting heads e, spring-cap H, attached at one end to the guard-finger, extending backward and bent down at its rear end to rest on the knives, the two twisted independent pitman-bars K K', the bolt M, provided with nut m', and the spring m, substantially as and for the purposes set forth.

HARVEY L. HOPKINS.

Witnesses:
 JNO. C. MACGREGOR,
 J. W. MILLINGTON.